F. RUDOLPH.
PROCESS OF HERMETICALLY CLOSING FILLED PRESERVING CANS.
APPLICATION FILED MAY 6, 1908.
1,086,730.
Patented Feb. 10, 1914.
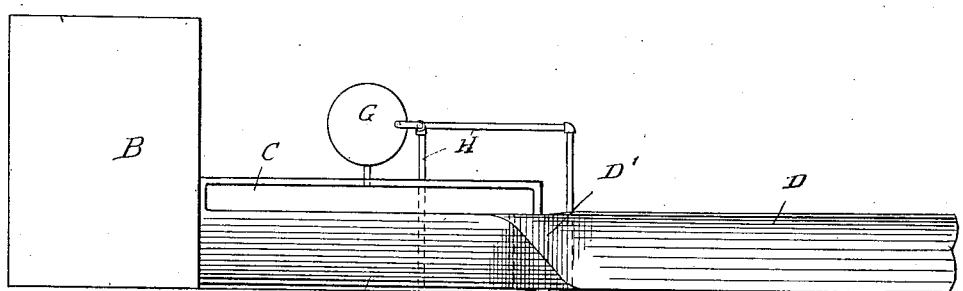
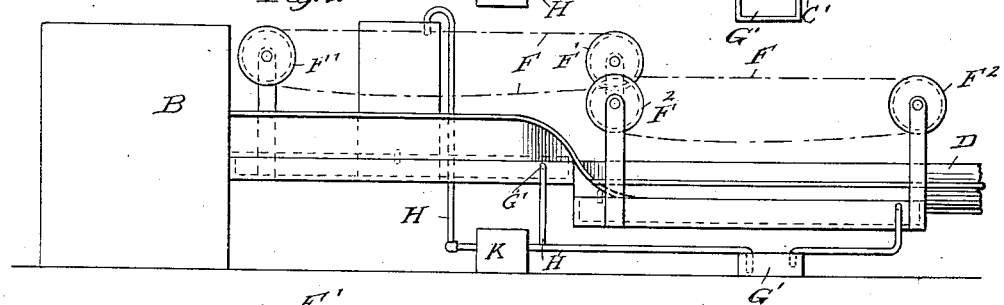
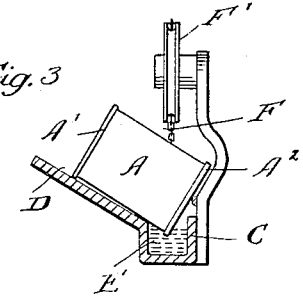
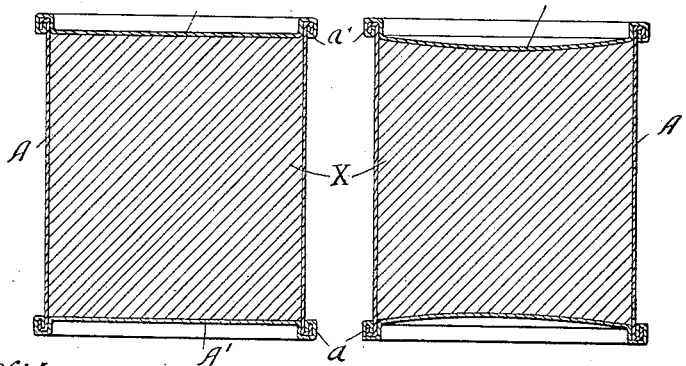
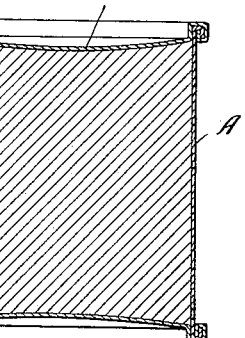
Witnesses:
Wm. Geiger
Inventor
Franklin Rudolph.
By Munday, Evarts, Adcock & Clarke.
Attorney

UNITED STATES PATENT OFFICE.

FRANKLIN RUDOLPH, OF CHICAGO, ILLINOIS, ASSIGNOR TO AMERICAN CAN COMPANY, OF NEW YORK, N. Y., A CORPORATION OF NEW JERSEY.

PROCESS OF HERMETICALLY CLOSING FILLED PRESERVING-CANS.

1,086,730. Specification of Letters Patent. Patented Feb. 10, 1914.

Application filed May 6, 1908. Serial No. 431,163.

*To all whom it may concern:*

Be it known that I, FRANKLIN RUDOLPH, a citizen of the United States, residing in Chicago, in the county of Cook and State of Illinois, have invented a new and useful Improvement in Processes of Hermetically Closing Filled Preserving-Cans, of which the following is a specification.

My invention relates to the art or process of hermetically closing food preserving cans.

Heretofore in practical operation considerable difficulty has been experienced from leaks developing in seams of food preserving cans after the cans have been filled and the covers secured thereon and the fruit, vegetables, fish or other food products in the cans cooked or processed to sterilize the same, and especially in cans wherein the final heads or covers are secured by a double or other folded seam without solder, by reason of fine pin holes, crevices or leaks in the seams which admit air to the can and destroy the vacuum within the can due to the cooking or processing operation, and ultimately resulting in fermentation of the contents of the can and the production of spoilers or "swell-heads" and consequent material loss to the packer.

I have discovered, and herein my invention consists, that this difficulty or trouble can be practically overcome, and a hermetically tight closure uniformly securing at very slight expense, by following the filling, double seaming or closing, and the cooking or processing steps or operations with a seam coating step with lacquer or other suitable leak or pinhole closing material, while the vacuum or partial vacuum still remains in the can from the cooking or processing operation, and preferably while the cans are still hot from such processing step, so that the tendency of the vacuum within the can to suck or draw air into it will cause the lacquer or other closing material, to be forced by atmospheric pressure on the outside into and fill and close up the pinholes or leaks of the seam, and thus render the defective can hermetically tight. The seam coating step or operation is preferably performed by rolling the cans in an inclined position through a bath or trough of liquid lacquer or other leak closing material.

In the accompanying drawing forming a part of this specification, I have, to enable my invention to be more readily understood, illustrated an apparatus suitable for use in practising it.

In said drawing Figure 1 is a diagrammatic plan view; Fig. 2 a side elevation; Fig. 3 a cross section; Fig. 4 a sectional view of a can showing the same after it has been filled and the final head or cover double seamed thereon and before the cooking or processing step; and Fig. 5 is a similar sectional view of the can after the cooking or processing step showing the heads thereof partially collapsed by reason of the vacuum in the can.

In the drawing A represents the body of a sheet metal can, $A^1$ the lower head seamed thereto, preferably by a double seam $a$, without solder, and $A^2$ the final head or cover likewise secured to the body A by a double seam $a^1$ after the can has been filled with the food products X to be preserved therein.

B represents the processing or cooking kettle or oven, C $C^1$ troughs containing liquid lacquer or other suitable leak or pinhole closing material, D a track or runway along which the cans may be rolled in a transversely inclined position, first with one head or end lowermost so that the double seam $a$ will be immersed in the liquid lacquer or leak closing material E in the trough C, and then with the other head or end lowermost so that its other seam $a^1$ will be immersed in the liquid lacquer or leak closing material E in the other trough $C^1$. The runway D has a twisted connecting portion $D^1$ between the two troughs C $C^1$.

F F are endless chains or belts traveling on pulleys $F^1$ $F^2$ for rolling the cans along the runway.

G is a supply tank or receptacle for the liquid lacquer or leak closing material E, $G^1$ an overflow receptacle, H connecting pipes between the two receptacles and the troughs C $C^1$, and K a pump for pumping the liquid lacquer or leak closing material from the lower receptacle $G^1$ to the upper receptacle G, so that the liquid in the troughs C $C^1$ may be kept at a constant level. By thus rolling the cans with their end seams through the lacquer troughs, such seams may be very quickly and rapidly coated with lacquer or other leak closing material, and if there are any fine pin holes or leaks in the seams, the vacuum, or partial vacuum, in the cans will tend to suck or draw the lacquer or closing material into such leaks, pinholes or crevices, and thus effectually and hermetically close them.

I claim:

The process of hermetically closing filled food preserving cans, consisting in first filling the cans, then seaming the final heads or covers on the filled cans and tightly closing the same, then cooking or processing the filled and tightly closed cans, and finally coating the seams of the cans with lacquer or other leak closing material while a partial vacuum remains in the cans and thereby causing the atmospheric pressure on the outside to force such lacquer or closing material into leaks or crevices and hermetically closing the same, substantially as specified.

FRANKLIN RUDOLPH.

Witnesses:
EDMUND ADCOCK,
H. M. MUNDAY.

Copies of this patent may be obtained for five cents each, by addressing the "Commissioner of Patents, Washington, D. C."